June 17, 1930. H. B. SHIELDS 1,763,868
BRAKE SYSTEM FOR SIX-WHEEL DRIVES
Filed May 29, 1928 2 Sheets-Sheet 2
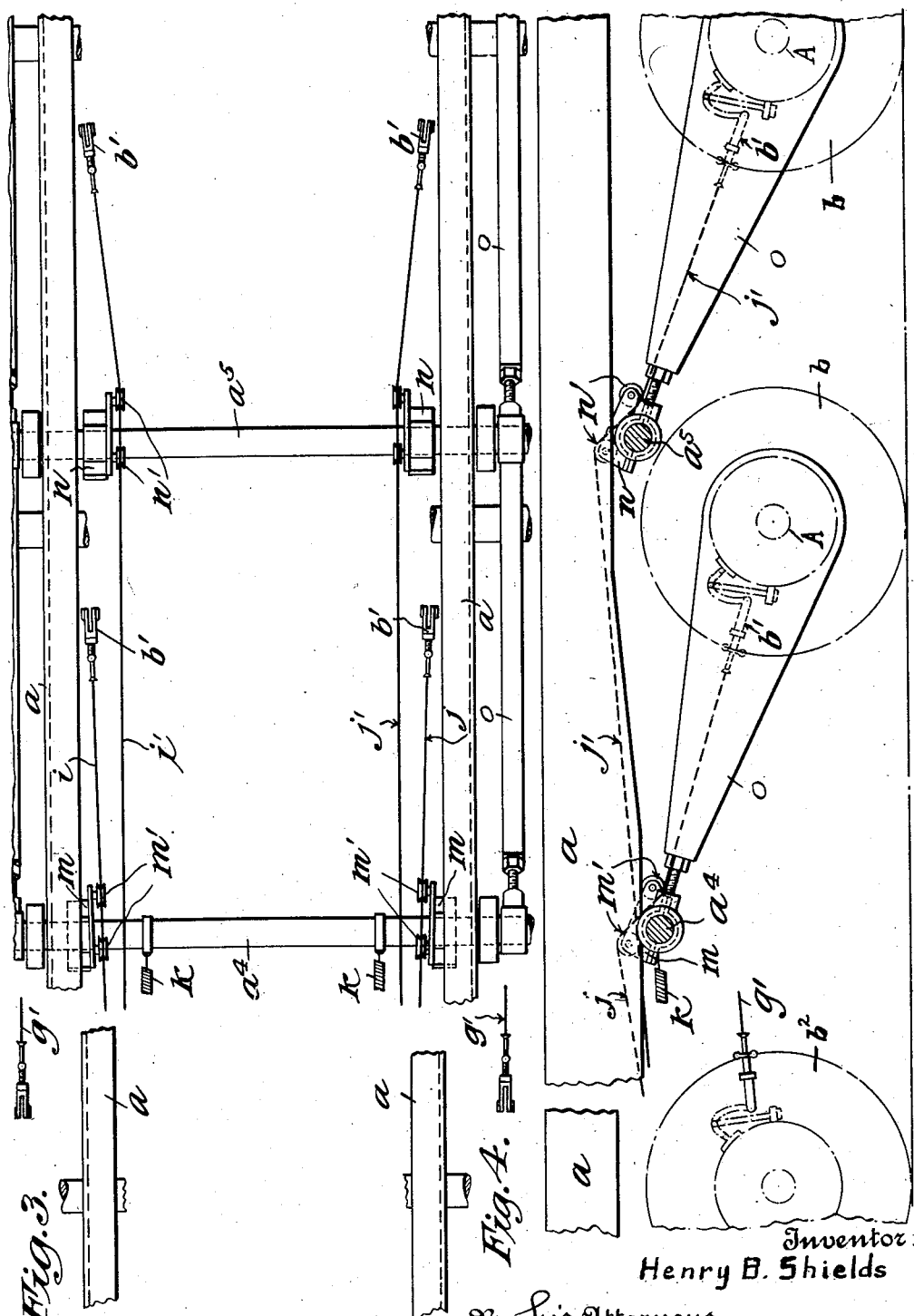

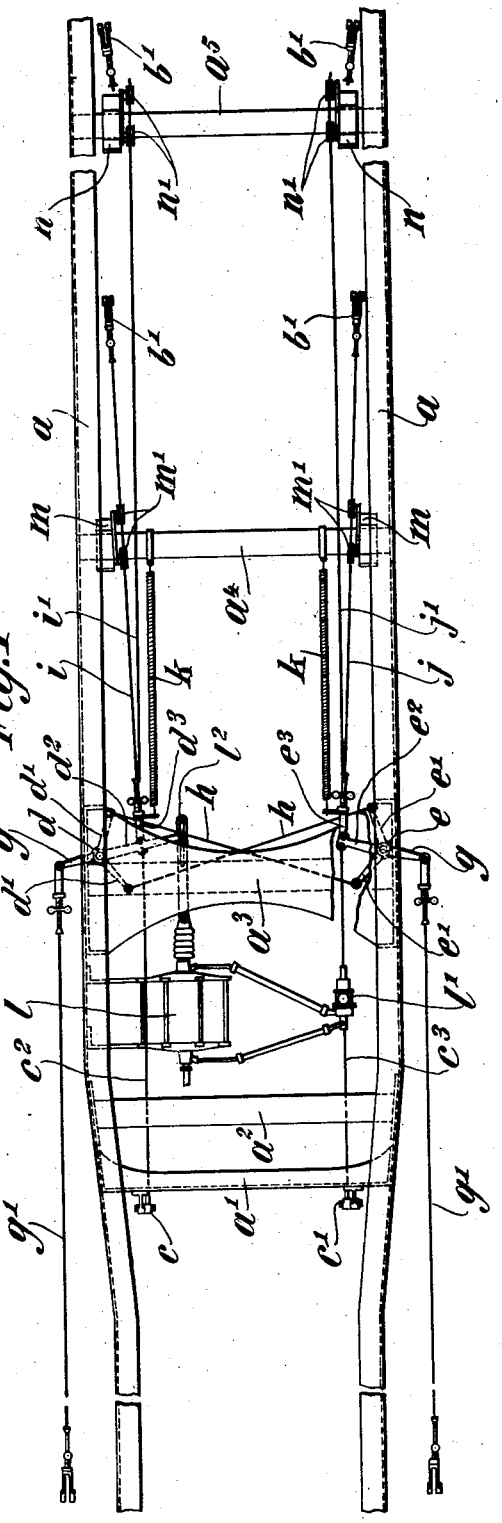
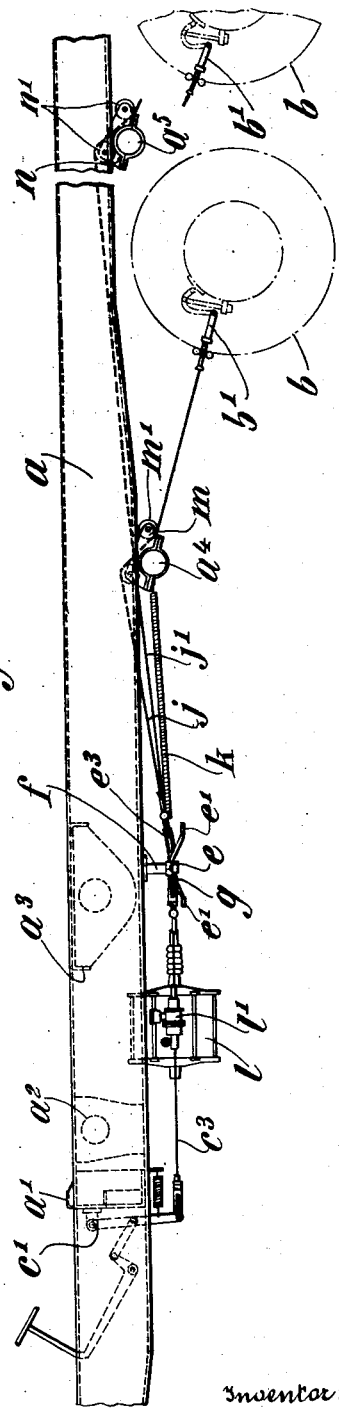

Patented June 17, 1930

1,763,868

UNITED STATES PATENT OFFICE

HENRY B. SHIELDS, OF FREEPORT, NEW YORK, ASSIGNOR TO INTERNATIONAL MOTOR COMPANY, OF NEW YORK. N. Y., A CORPORATION OF DELAWARE

BRAKE SYSTEM FOR SIX-WHEEL DRIVES

Application filed May 29, 1928. Serial No. 281,402.

This invention relates to braking systems for vehicles having two or more driving axles and having brakes mounted on the driving wheels as well as the steering wheels. The common practice of providing brakes on the front as well as the rear wheels has been developed quite satisfactorily with four wheel vehicles, the problem confronted in this construction being that of providing a system which may be adjusted and equalized in a manner such that the brakes of all four of the wheels will be applied simultaneously and with equal pressure. In larger vehicles carrying vacuum braking mechanism as well as the usual service and hand brakes, less satisfactory results have been obtained from the systems now employed. The problem of providing a mechanism which is suitably positioned upon the frame, and can accommodate connections from the plurality of sources of power which may be applied simultaneously or individually, has been successfully solved by the system constituting the present invention.

An object of this invention is to provide a positively acting system in which the connections between the brakes of the several wheels are such that all of the brakes will be applied simultaneously and with equal force regardless of the relative positions of the individual wheels with respect to the frame, the system and connections at the same time being light and strong. In order to accomplish this object, the connections between the brake operating mechanism and the brake mechanism carried by the respective means are of a flexible character and mounted on suitable pulleys at the pivot point of the radius rod to the frame so that movement of the wheels will cause movement of the extreme portion of the operating connection between the wheels and pivot point of the radius rod, of an equivalent amount to that of the movement of the radius rod. The character of the mounting of the brake operating connection at the pivot point of the radius rod is such that movement of the wheel will not cause a shortening of the connection and a corresponding application of the brake.

The invention will be understood more fully in connection with the following description and accompanying drawings, wherein:

Figure 1 is a plan view, partly broken away, showing a vehicle frame provided with the brake operating mechanism of the present invention.

Figure 2 is a view in side elevation showing the braking system of Figure 1.

Figure 3 is a plan view, partly broken away, showing in detail pulleys of the brake operating mechanism.

Figure 4 is a side elevation, partly broken away, of the vehicle.

Referring to the above figures, $a$ designates the side frame members of a vehicle frame provided with cross members $a'$, $a^2$, $a^3$, $a^4$ and $a^5$. The rear driving axles are shown at A—A, and steering wheel at $b^2$. The rear driving wheels are indicated schematically at $b$, suitable connections $b'$ being provided for the respective braking mechanisms of each wheel. An emergency lever is pivoted on shaft $c$ and the usual service pedal upon shaft $c'$. Both of these shafts are carried by the cross member $a'$ and are connected to bell crank levers $d$ and $e$ by connections $c^2$ and $c^3$. Upon opposite sides of the vehicle frame and adjacent the cross member $a^3$, pivot shafts $f$ are provided for carrying the bell cranks $d$ and $e$. The latter are formed with outwardly extending arms $g$ to which connections $g'$ are secured for operating the brakes on the front or steering wheels. Arms $d'$ on bell crank $d$ and arms $e'$ on bell crank $e$ are connected together by flexible cross ties $h$, thus causing the bell cranks to move simultaneously. An arm $d^2$ on bell crank $d$ is connected to a turn buckle or other fastening means $d^3$, to which connections $i$ and $i'$ are secured for operating the brakes of the forward and rearward rear wheels on this side of the vehicle. Bell crank $e$ is provided with a corresponding arm $e^2$ to which is secured a connecting means $e^3$, similar to element $d^3$, the element $e^3$ being secured to the connections $j$ and $j'$. These connections operate the brakes of the forward and rearward rear wheels on the side of the vehicle opposite from the brakes operated by the connections $i$ and $i'$. Suitable retractile springs $k$ are provided to cause the brake operating mechanism to assume a normal inoperative position. The connections $c^3$ is secured to the arm $e^2$ of bell crank $e$ and is provided with a booster brake valve $l'$ for operating a booster brake operating mechanism $l$. A connecting link $l^2$ operates the bell crank $d$ through an extension of the arm $d^2$. The connection $c^2$ is secured to the arm $d^2$ of bell crank $d$, thus providing for the operation of the system through the hand lever.

At either side of the front jack shaft $a^4$, a bracket $m$ carrier pulleys $m'$. The latter are formed to receive the flexible connecting elements $i$ and $j$ as clearly shown in Figure 2. A corresponding bracket $n$ is mounted on the ends of the jack shaft $a^5$ and is provided with pulleys $n'$, similar to those of the bracket $m$. Over these pulleys flexible connecting elements $i'$ and $j'$ are passed. These pulleys are mounted upon the frame adjacent the pivot point of the radius rods $o$ and permit the flexible brake operating connections to wind and unwind in a manner such that the length of cable between the brake and the respective pivot point at the frame will not change regardless of the extent of movement of the wheel with respect to the frame. This function is made possible by positioning the rearmost of the pulleys $m'$ as near the pivot point of the radius rod as possible, causing very little relative movement between the radius rod and the above described length of brake operating cable.

Although the invention has been described with respect to the specific connections shown in the drawings, it is not to be limited, save as defined in the appended claims.

I claim as my invention:

1. In a vehicle having a plurality of driving axles, and braking means on the axles, a plurality of steering wheels and braking means on the steering wheels, brake operating mechanism including bell cranks pivotally mounted on opposite sides of the vehicle frame, a plurality of arms on the bell cranks, means to connect certain of the arms of each bell crank with the braking means on the driving axles, means to connect other of the arms of the bell cranks with the braking means on the steering wheels, connections between certain of the arms of the bell cranks to cause them to move simultaneously, and a connection between one of the arms and the brake operating mechanism.

2. In a vehicle having a plurality of driving axles and braking means on the axles, a plurality of steering wheels and braking means on the steering wheels, brake operating mechanism including bell cranks pivotally mounted on opposite sides of the vehicle frame, a plurality of arms on the bell cranks, means to connect certain of the arms of each bell crank with the braking means on the driving axles, means to connect other of the arms of the bell cranks with the braking means on the steering wheels, connections between certain of the arms of the bell cranks to cause them to move simultaneously, booster brake mechanism, means to connect the booster brake mechanism with one of the arms, manual brake operating means, and means to connect the manual means to one of the arms.

This specification signed this 22d day of May, A. D. 1928.

HENRY B. SHIELDS.